(12) United States Patent  (10) Patent No.: US 7,788,951 B2
Shimada et al.  (45) Date of Patent: Sep. 7, 2010

(54) METHOD OF ELONGATING AN OPTICAL FIBER BASE MATERIAL

(75) Inventors: Tadakatsu Shimada, Gunma (JP); Takaaki Nagao, Ibaraki (JP); Soichiro Kemmochi, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1168 days.

(21) Appl. No.: 11/392,657

(22) Filed: Mar. 30, 2006

(65) Prior Publication Data

US 2006/0225860 A1    Oct. 12, 2006

Related U.S. Application Data

(63) Continuation of application No. PCT/JP2004/014192, filed on Sep. 28, 2004.

(30) Foreign Application Priority Data

Sep. 30, 2003  (JP) ............................. 2003-339729

(51) Int. Cl.
    C03B 37/02  (2006.01)
    C03B 37/07  (2006.01)
(52) U.S. Cl. ............................. 65/377; 65/381; 65/435; 65/484
(58) Field of Classification Search ................ 65/377, 65/381, 435, 484, 537
    See application file for complete search history.

(56) References Cited

U.S. PATENT DOCUMENTS 2,992,517 A * 7/1961 Hicks, Jr. ..................... 65/401

3,876,877 A * 4/1975 Meulensteen et al. .... 250/222.1

(Continued)

FOREIGN PATENT DOCUMENTS

EP    0367871    * 5/1990

(Continued)

OTHER PUBLICATIONS

A partial English translation of a preliminary Notice of First Office Action for 093129554, Jul. 15, 2009, 4 pages.*

(Continued)

*Primary Examiner*—John Hoffmann
(74) *Attorney, Agent, or Firm*—McGinn IP Law Group, PLLC

(57) ABSTRACT

There is provided an elongation method of an optical fiber base material, by which a base material rod not requiring a process for modifying a bend from base material ingot is obtained. The method for elongating base material ingot to be a base material rod having a diameter smaller than before to manufacture an optical fiber base material, includes the steps of: elongating the base material ingot while controlling a control position so that a neck-down within a horizontal surface of the base material ingot is located at a target position; measuring a bending direction and a bending amount of an elongated base material rod; and adjusting the target position based on the result. In addition, it is preferable to adjust a position of a pendant portion of base material ingot in order to control the position of the neck-down to be the target position. For example, the position of the pendant portion may be moved in an XY direction, more particularly, in a direction in which the measured bend shows convexity.

10 Claims, 4 Drawing Sheets

U.S. PATENT DOCUMENTS

| | | | | | |
|---|---|---|---|---|---|
| 4,119,760 | A | * | 10/1978 | Rinehart | 428/410 |
| 4,350,513 | A | * | 9/1982 | Coucoulas et al. | 65/29.12 |
| 5,284,499 | A | * | 2/1994 | Harvey et al. | 65/435 |
| 5,558,692 | A | * | 9/1996 | Chervenak et al. | 65/382 |
| 6,178,778 | B1 | * | 1/2001 | Kenmochi et al. | 65/381 |
| 6,386,001 | B1 | * | 5/2002 | Shimizu et al. | 65/377 |
| 6,742,363 | B1 | | 6/2004 | Yamamura et al. | |
| 2002/0069674 | A1 | * | 6/2002 | Guy et al. | 65/377 |
| 2003/0140658 | A1 | * | 7/2003 | Caiata et al. | 65/402 |

FOREIGN PATENT DOCUMENTS

| | | |
|---|---|---|
| JP | 10-114536 | 5/1998 |
| JP | 10-158024 | 6/1998 |
| JP | 2000-264664 | 9/2000 |
| JP | 2003-183041 | 7/2003 |

OTHER PUBLICATIONS

Patent/Publication No. 182745, pp. 2 pages, Jul. 15, 2009.*

Publication No. 2003-183041, Patent Abstracts of Japan, unknown date, p. 1.*

Publication No. 10-158024, Patent Abstracts of Japan, unknown date, p. 1.*

Publication No. 10-114536, Patent Abstracts of Japan, p. 1, date unknown.*

* cited by examiner

METHOD OF ELONGATING AN OPTICAL FIBER BASE MATERIAL

CROSS REFERENCE TO THE RELATED APPLICATION

The present application is a continuation application of PCT/JP2004/14192 filed on Sep. 28, 2004, which claims priority from a Japanese Patent application No. 2003-339729 filed on Sep. 30, 2003, the entire contents of which are incorporated herein by reference for all purposes.

BACKGROUND OF THE INVENTION

1. Field of the Invention

The present invention relates to a method for manufacturing an optical fiber base material, and more particularly relates to a method for manufacturing an optical fiber base material reducing a bend of an optical fiber base material rod after an elongation in an elongation process elongating base material ingot for optical fiber to be a base material rod having a diameter smaller than before.

2. Description of Related Art

In regard to a method of elongating a base material ingot to be a base material rod having a diameter smaller than before to manufacture an optical fiber base material, there is known a method for heating the base material ingot in an electric furnace, measuring an outside diameter of a heating and melting portion by means of a diameter measurement device while softening the ingot, and controlling a withdrawal speed of the base material rod based on the measured value. The base material rod elongated and obtained in this method may have a bend according to a temperature distribution in an elongating furnace and a set state of the base material ingot.

As measures against this, Japanese Patent Application Publication Nos. 1997-030825 and 1997-030827 disclose a method for measuring a misaligned amount between a central axis line of base material ingot set in an elongating apparatus and a shaft center of the elongating apparatus and changing a gripping angle of the base material ingot or moving a position of the base material ingot, so that the central axis line of base material ingot is identical with the shaft center of the elongating apparatus based on the misaligned amount, in order to elongate the base material ingot while modifying the position of the base material ingot. Moreover, Japanese Patent Application Publication 2000-247664 discloses a method for measuring a bending amount in an elongation and adjusting the number of revolutions of both sides of a roller withdrawing a base material rod, in order to reduce a bend.

The method disclosed in Japanese Patent Application Publication Nos. 1997-030825 and 1997-030827 for controlling the position of base material ingot to be a predetermined position in the elongating apparatus has a problem that a bend is caused even if the base material ingot is controlled to the target position, because a portion hanging the base material ingot or a portion withdrawing the elongated base material rod is changed by maintenance such as the exchange of heater with time and a bias occurs in a temperature distribution in a circumferential direction of a heater or a heat insulator or an airflow inside a furnace. Moreover, the method for adjusting the number of revolutions of a roller disclosed in Japanese Patent Application Publication 2000-247664 has a problem that it is not possible to modify a bend to a direction except the direction of the roller.

In this manner, since a base material rod having a bend caused by elongation significantly damages workability when drawing an optical fiber and stability of an optical fiber characteristic, the base material rod having a bend requires a process for previously modifying this bend when drawing an optical fiber. However, since there is a disadvantage that this process significantly reduces productive efficiency, the development of a method for elongating base material ingot such that a base material rod does not have a bend is requested.

SUMMARY OF THE INVENTION

Therefore, it is an object of the present invention to provide a method of elongating an optical fiber base material, by which a base material rod not requiring a process modifying a bend from base material ingot is obtained.

According to the first aspect of the present invention, there is provided a method of elongating a base material ingot to be a base material rod having a diameter smaller than before to manufacture an optical fiber base material. The elongation method of the optical fiber base material includes the steps of: elongating the base material ingot while controlling a control position so that a neck-down within a horizontal surface of the base material ingot is located at a target position; measuring a bending direction and a bending amount of an elongated base material rod; and adjusting the target position based on the result. In addition, it is preferable to adjust a position of a pendant portion of base material ingot in order to control the position of the neck-down to be the target position. For example, the position of the pendant portion may be moved in an XY direction, more particularly, in a direction in which the measured bend shows convexity. At this time, it is preferable that an adjusting amount of the target position is substantially 0.2 times to 20 times per meter of the measured bending amount of base material rod.

In this way, there is obtained an optical fiber base material (a base material rod) that has a superior optical characteristic and a bending amount not more than 0.2 mm/m.

According to the second aspect of the present invention, there is provided a method of elongating a base material ingot to be a base material rod having a diameter smaller than before to manufacture an optical fiber base material. The elongation method of the optical fiber base material includes the steps of: elongating one base material ingot; measuring a bending direction and a bending amount of an elongated base material rod; adjusting a target position of a neck-down within a face perpendicular to an axial direction of other base material ingot based on the result; and elongating the other base material ingot while controlling the target position.

According to a manufacture method of an optical fiber base material of the present invention, since a bend of a base material rod after elongating base material ingot can be extremely reduced, it is possible to obtain an optical fiber base material without a process for modifying a bend of the obtained base material rod and thus reduce a manufacture cost of an optical fiber.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

According to an elongation method of an optical fiber base material of an embodiment of the present invention, a bending direction and a bending amount of a base material rod are measured during elongation, and a target position is adjusted so that a neck-down of which a diameter gets narrow by heating and melting is located at the target position previously set within a horizontal surface. For example, the position of a pendant portion of base material ingot is quoted as a control position adjusting the target position.

A direction adjusting the target position is a direction in which the measured bend shows convexity, in other words, a direction to a back (arc) side of the base material rod curved in an arciform manner. By such a movement, the curved back (arc) side of the base material ingot is relatively close to a heating heater, and an amount of heat received from a circumferencial direction is adjusted, in order to obtain the base material rod elongated straight.

An adjusting amount of the target position is substantially 0.2 times to 20 times per meter of the measured bending amount of the base material rod, and preferably is 0.5 times to 10 times. In addition, when the adjusting amount exceeds 20 times, it is difficult to adjust a bend of the base material rod, and thus it is necessary to change a thermal condition.

Figure 1:
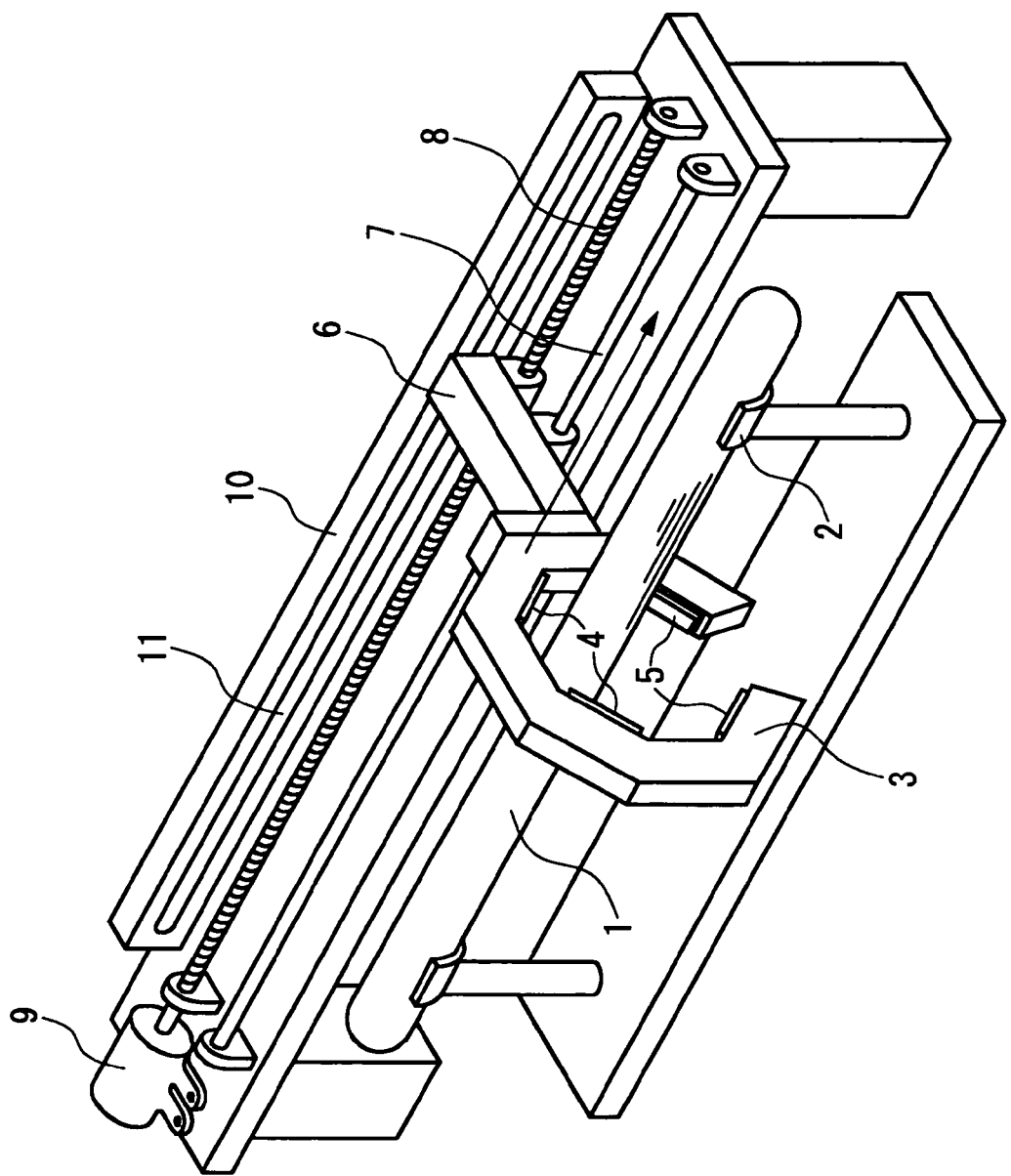
FIG. 1 is a schematic perspective diagram showing a shape measuring device.

The measurement of bending amount can be performed in the method disclosed in Japanese Patent Application Publication No. 1998-062299. This shape measuring device is schematically shown in FIG. 1.

According to this method, a base material rod 1 obtained by elongation is put on a maintenance pedestal 2, a diameter measurement device 3 is moved along a longitudinal direction of the base material rod 1, laser light is irradiated from two directions perpendicular to each other to measure a position of an outside diameter of the base material rod 1 by means of an edge detector 4 and 5 (4: a laser irradiator and 5: a laser photoreceiver) attached to the diameter measurement device 3, and a longitudinal direction distribution of a center location is obtained from the obtained result. The diameter measurement device 3 is provided to move along a guide rail 7 by a threaded rod 8 and a motor 9 along with a scanning plate 6 that is attached to the diameter measurement device 3 in an integrated fashion. In addition, a reference numeral 10 is a linear encoder, and a reference numeral 11 is a detection window.

At this time, a distance from a reference line linking center locations at both ends of a straight portion of the base material rod 1 with a straight line to a measured center location of the base material rod 1 defines a bending amount at each measuring point, a value at the point showing a maximum value defines a bending amount of this base material rod, and the direction defines a bending direction. In addition, since a bending amount varies when the distance between both ends of the straight portion varies, the bending amount is obtained by correcting the amount using a length of 1 m as a standard. For example, a bending amount is obtained by dividing i) the obtained bending amount data by ii) the length of base material rod 1 divided by 1 m.

Next, a comparative example and an embodiment of the present invention will be described.

Comparative Example 1

Figure 2:
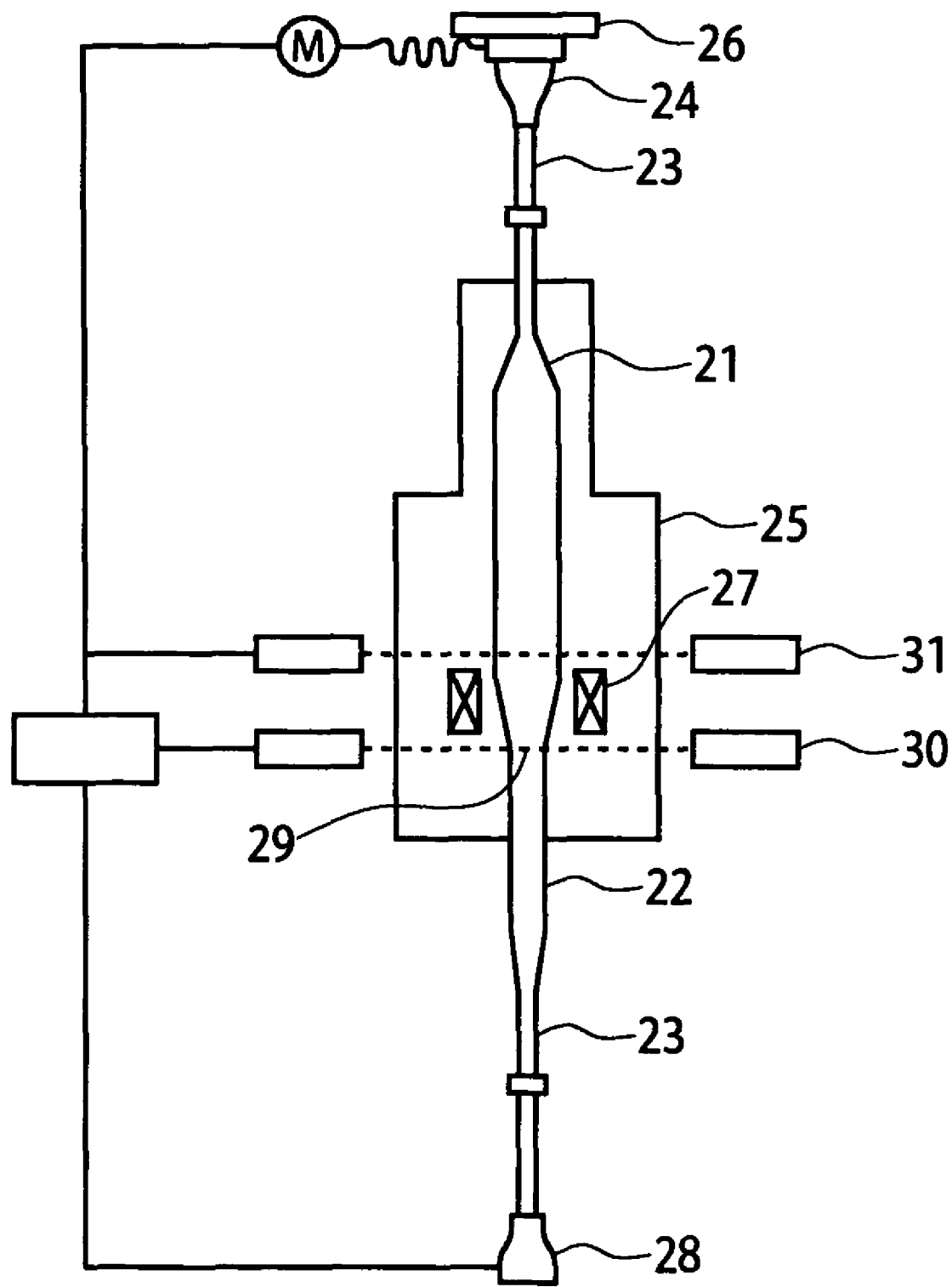
FIG. 2 is a schematic vertical cross-sectional view showing an elongating apparatus of base material ingot.

By means of an elongating apparatus shown in FIG. 2, base material ingot 21 with a thick diameter is elongated, and a base material rod 22 having a diameter smaller than before is manufactured.

Specifically, dummy rods for grasp 23 are respectively welded to top and bottom ends of the base material ingot 21 having an outside diameter of 120 mm and an effective length of 800 mm, the dummy rod for grasp 23 welded to the upper side of base material ingot 21 is attached to a chuck for pendant 24 to be hung on an elongating furnace 25, and the position adjustment in the horizontal direction is performed by an XY stage 26. Next, the base material ingot 21 is heated by a heating heater 27 and is withdrawn by an elongation withdrawing mechanical portion 28, in order to manufacture a base material rod 22 having a predetermined diameter.

In regard to an outside diameter during elongation, an outside diameter of a neck-down portion 29 reduced by heating and melting is measured by a diameter measurement device 30, and a withdrawal speed is controlled so that the outer diameter is constant and a final outside diameter of the base material rod 22 is 40 mm. At this time, a neck-down position of the base material ingot 21 is measured by the diameter measurement devices 30 (the device in an orthogonal direction is not shown) located at two directions perpendicular to the base material ingot every four seconds, and the XY direction position is controlled by the chuck for pendant 24 so that the center location of the neck-down portion 29 is identical with a central axis line of the furnace based on the measured position. In addition, a reference numeral 31 is a position measuring device.

The base material rod elongated in this method is divided by a length of 1 m, and a bending amount is measured by the shape measuring device showed in FIG. 1. Bending amounts of a lot of base material rods elongated in a similar method are measured and shown in FIG. 3. In an X direction of the drawing, the right side is a plus value toward a furnace and the left side is a minus value toward the furnace. In a Y direction, a back side is a plus value and a front side is a minus value.

Figure 3:
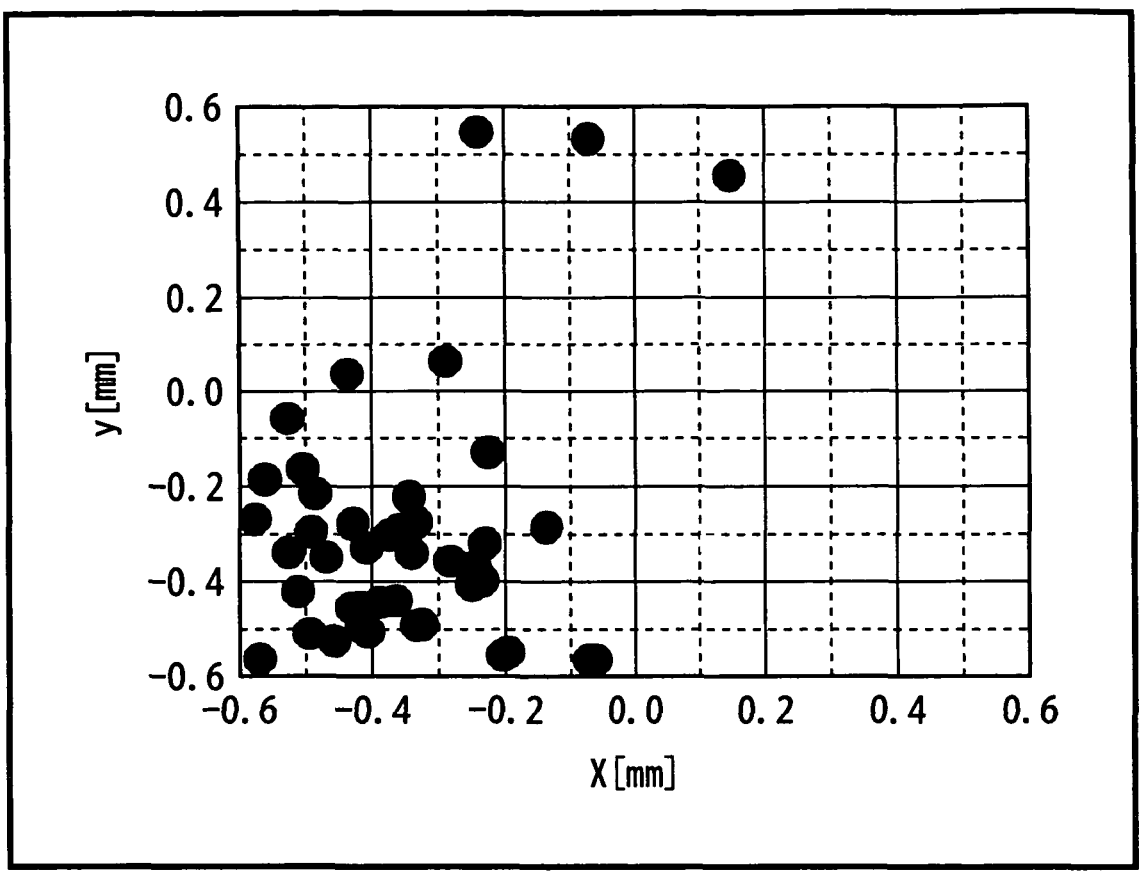
FIG. 3 is a graph showing a bend distribution of a base material rod elongated in Comparative Example 1.

As apparent from FIG. 3, it can be understood that there are many base material rods that are bent by 0.4 mm to the left and 0.4 mm to the front.

Embodiment 1

Figure 4:
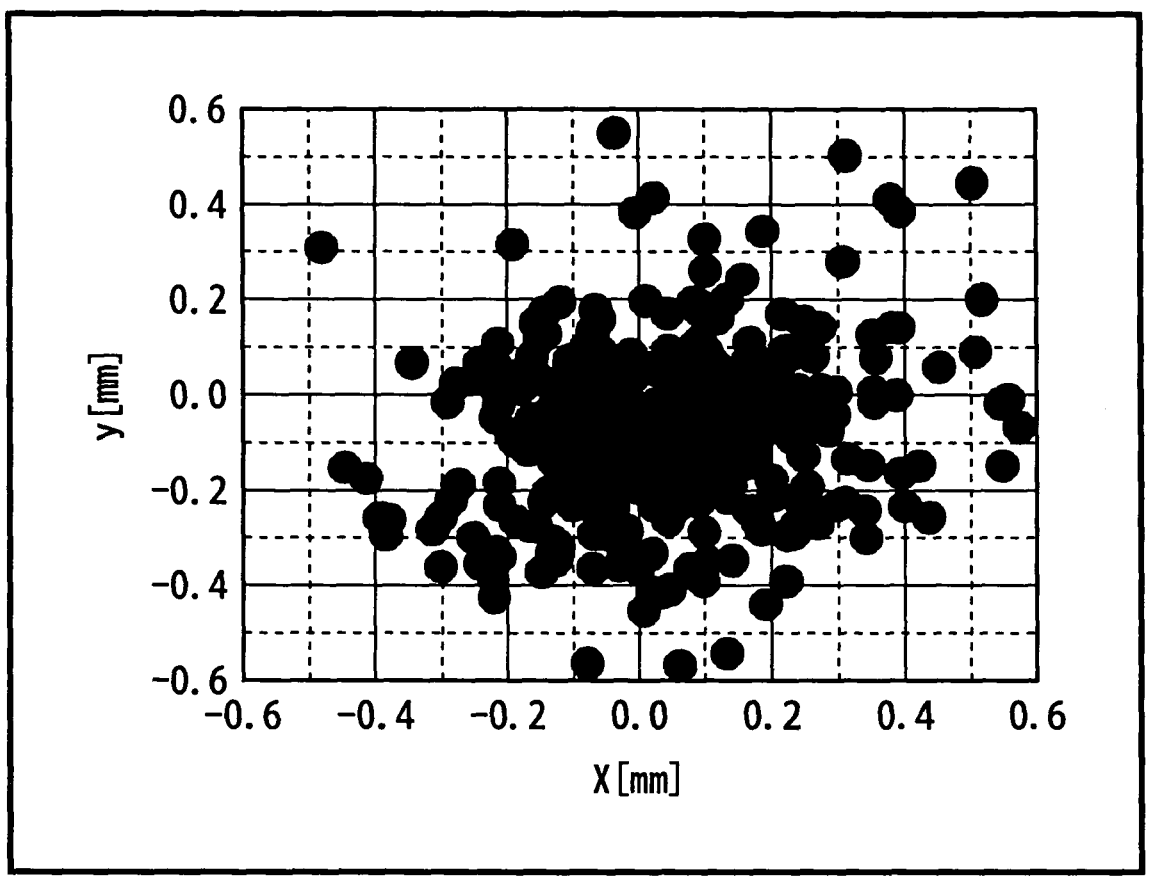
FIG. 4 is a graph showing a bend distribution of a base material rod elongated by an elongation method of the present invention (Embodiment 1) after adjusting a control position.

In the embodiment, using Comparative Example 1 as an example of one base material ingot in the present invention, as an example of other base material ingot in the present invention, a target position of a neck-down portion of new base material ingot is changed by 2 mm to the left and 1.5 mm to the front from the result of Comparative Example 1, and the elongation is performed in a manner similar to Comparative Example 1. Similarly, bending amounts of a lot of elongated base material rods are measured and shown in FIG. 4. FIG. 4 slightly has a bias toward a plus side of an X direction and a minus side of a Y direction. However, this bias occupies 80% or more within ±0.2 mm. Here, a XY direction is an example within a plane perpendicular to an axial direction of the base material ingot in the present invention.

According to a modifying amount (an adjusting amount) and a modifying direction (an adjusting direction) of the target position performed in Embodiment 1, a bend is reduced in a bending direction (a convexing direction). However, the bending direction and the modifying amount of the target position are not identical with each other. The ratio (magnification) of the bending amount and the modifying amount of the target position is different according to apparatuses. When a bend is large, magnification is small. As a bend becomes small, magnification becomes large. If a bend further becomes small, magnification tends to become small. The modifying amount is approximately within 0.2 to 20 times per meter of the bending amount.

A base material rod obtained by means of an elongation method of the present invention can be used for various applications as a glass rod having straightness of high accuracy.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A method of elongating a base material ingot to be an optical fiber base material rod having a diameter smaller than before, the elongation method comprising:
   controlling a control position so that a neck-down within a plane perpendicular to an axial direction of the base material ingot is located at a target position;
   during said controlling, elongating the base material ingot to be the optical fiber base material rod;
   measuring a bending direction and a bending amount of the optical fiber base material rod; and
   adjusting the target position based on said measuring.

2. A method of elongating a base material ingot to be an optical fiber base material rod having a diameter smaller than before, the elongation method comprising:
   elongating one base material ingot to be an optical fiber base material rod;
   measuring a bending direction and a bending amount of the optical fiber base material rod;
   adjusting a target position of a neck-down within a plane perpendicular to an axial direction of another base material ingot based on said measuring;
   controlling a control position so that the neck-down is located at the target position; and
   during said controlling, elongating the another base material ingot.

3. The elongation method as claimed in claim 1, further comprising adjusting a position of a pendant portion of the base material ingot so that the neck-down is located at the target position.

4. The elongation method as claimed in claim 1, further comprising moving a position of a pendant portion of the base material ingot in an XY direction so that the neck-down is located at the target position.

5. The elongation method as claimed in claim 1, wherein the direction adjusting the target position is a direction in which a measured bend of the optical fiber base material rod shows convexity.

6. The elongation method as claimed in claim 1, wherein an adjusting amount of the target position is substantially 0.2 times to 20 times per meter of the measured bending amount of the optical fiber base material rod.

7. The elongation method as claimed in claim 2, further comprising adjusting a position of a pendant portion of the another base material ingot so that the neck-down is located at the target position.

8. The elongation method as claimed in claim 2, further comprising moving a position of a pendant portion of the another base material ingot in an XY direction so that the neck-down is located at the target position.

9. The elongation method as claimed in claim 2, wherein the direction adjusting the target position is a direction in which a measured bend of the optical fiber base material rod shows convexity.

10. The elongation method as claimed in claim 2, wherein an adjusting amount of the target position is substantially 0.2 times to 20 times per meter of the measured bending amount of the optical fiber base material rod.

* * * * *